United States Patent [19]

Robins et al.

[11] 3,863,862

[45] Feb. 4, 1975

[54] KINEMATOGRAPH PROJECTION APPARATUS

[75] Inventors: Peter Robins, New Driston; Leroy G. Osborn, London, both of England

[73] Assignee: Westrex Company Limited, London, England

[22] Filed: July 24, 1972

[21] Appl. No.: 274,187

[30] Foreign Application Priority Data
July 28, 1971 Great Britain.................... 35390/71

[52] U.S. Cl.................. 242/181, 242/205, 352/125
[51] Int. Cl............................................... G03b 1/04
[58] Field of Search .......... 242/205, 204, 203, 202, 242/201, 57, 181, 210, 180, 187, 188, 189, 190, 186, 75.51, 67.4; 352/124, 125

[56] References Cited
UNITED STATES PATENTS

| | | | |
|---|---|---|---|
| 3,079,100 | 2/1963 | Brown et al. | 242/57 |
| 3,115,314 | 12/1963 | Manley et al. | 242/75.51 X |
| 3,199,801 | 8/1965 | Svendsen | 242/75.51 X |
| 3,386,674 | 6/1968 | Guernet | 242/181 |
| 3,527,426 | 9/1970 | Morrow | 242/190 |
| 3,680,805 | 8/1972 | Stewart et al. | 242/67.4 |

*Primary Examiner*—George F. Mautz
*Attorney, Agent, or Firm*—Alan C. Rose; Thomas A. Turner, Jr.

[57] ABSTRACT

A film pay-off and take-up accessory is provided for a film projector. The accessory includes first and second pairs of pay-off and take-up film reels each carried on motor-driven spindles supported by a rotatable housing. Preferably, the reels are large diameter reels, such as about 12 inches in diameter. The housing is rotatable between a first position wherein the first pair of pay-off and take-up reels are in alignment with the projector for projection, and a second position wherein the second pair of reels are in alignment with the projector for projection; the pair of reels not in alignment for projection being controllable for film rewind.

10 Claims, 10 Drawing Figures

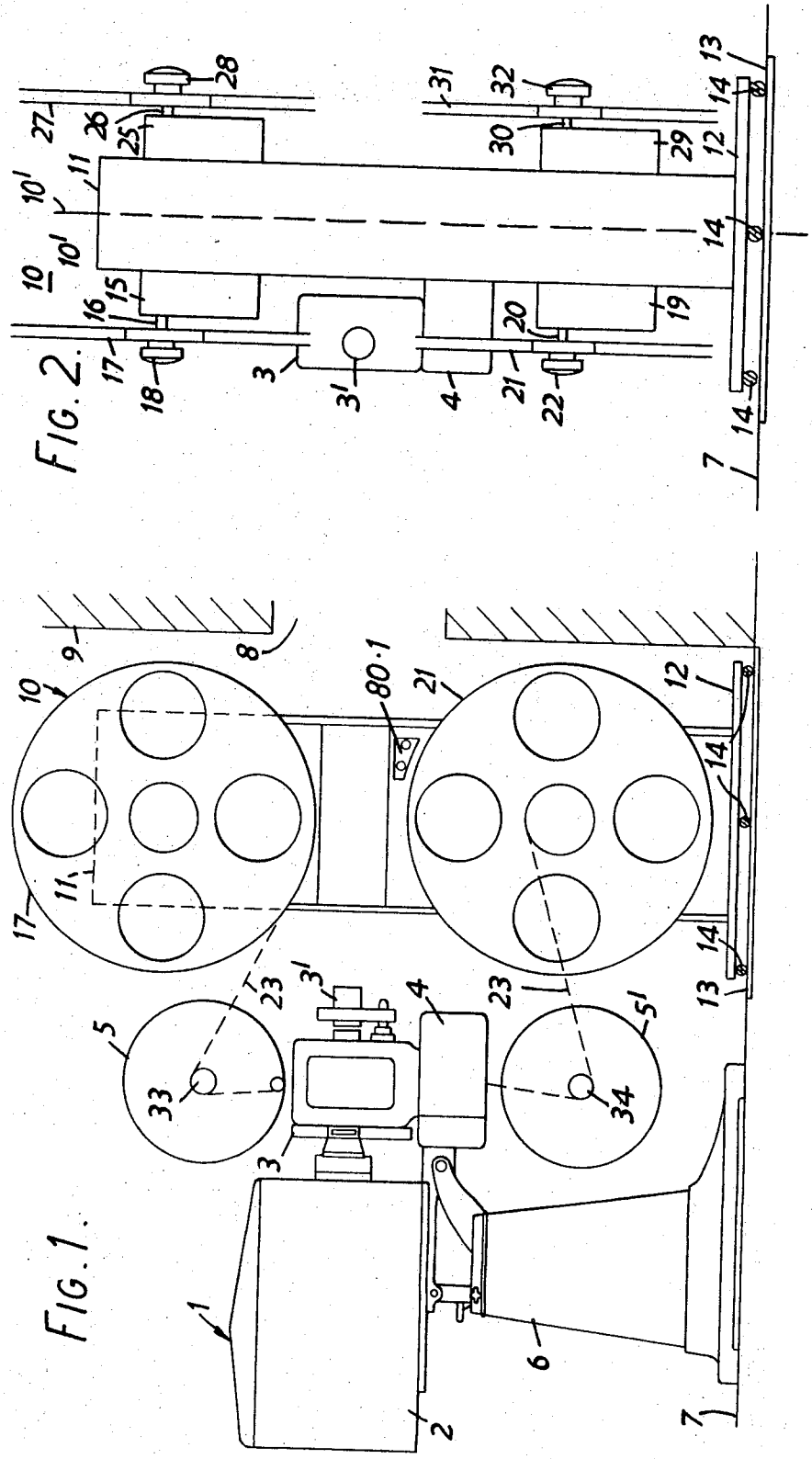

KINEMATOGRAPH PROJECTION APPARATUS

This invention relates to kinematograph film projection apparatus and particularly to standard 35 mm film projectors by which film is projected from reels several times larger than the normal sized reels of 1,000 feet capacity, in order to provide continuous film projection of an entire feature film without switching over projectors.

Heretofore, kinematograph film projectors utilized reels having a capacity of about 1,000 feet of film corresponding to about 10 minutes of projection time at the standard projection speed of 24 frames per second for 35 mm projectors. Thus, at the end of any particular 1,000 feet film strip, the projection had to be switched over to another projector to project the next film strip. For a feature program, for example a program having as much as 2 hours duration, as many as 12 or more such reels were required, thereby necessitating surveillance by an operator to switch projectors as well as to maintain the proper sequence of reels. The present invention is concerned with apparatus by which an entire feature program may be projected without switching over projectors.

It is an object of the present invention to provide large-reel pay-off and take-up accessory apparatus for use with a standard film projector.

Another object of the present invention is to provide an improved, large-reel film projector.

In accordance with the present invention, a large-reel film pay-off and take-up accessory apparatus for a film projector comprises a rotatable assembly having first and second pairs of large-diameter pay-off and take-up film reels carried on motor-driven spindles. The apparatus is rotatable to a first position in which the first pair of pay-off and take-up reels are brought into correct alignment with the film projector for film projection, the second pair of reels being controllable for film rewind. The apparatus is rotatable to a second position in which the second pair of pay-off and take-up reels are aligned with the film projector for film projection, the first pair of reels then being controlled for film rewind.

In one form of the invention, a large-reel film projector comprising two units, the first unit providing film transport and projection apparatus and the second unit providing large-reel pay-off and take-up apparatus as defined above.

One feature of the present invention resides in the fact that the large-reel pay-off and take-up apparatus may be placed in front of the projector unit or behind, considering the direction of projection as forward.

Another feature of the present invention resides in the use of large-diameter spools to carry the wound film reels. Alternatively, the apparatus may utilize the film centers upon which the film reels are wound for space conservation purposes, or may use film cassettes. de The above and other features of this invention will be more fully understood from the following detailed description and the accompanying drawings, in which:

FIG. 1 is a side elevation view of a film projector comprising a standard 35 mm film projector unit with a large-reel, film pay-off and take-up unit in accordance with the presently preferred embodiment of the present invention mounted in front of the projector unit;

FIG. 2 is a front elevation view of the film projector shown in FIG. 1;

Figure 5:
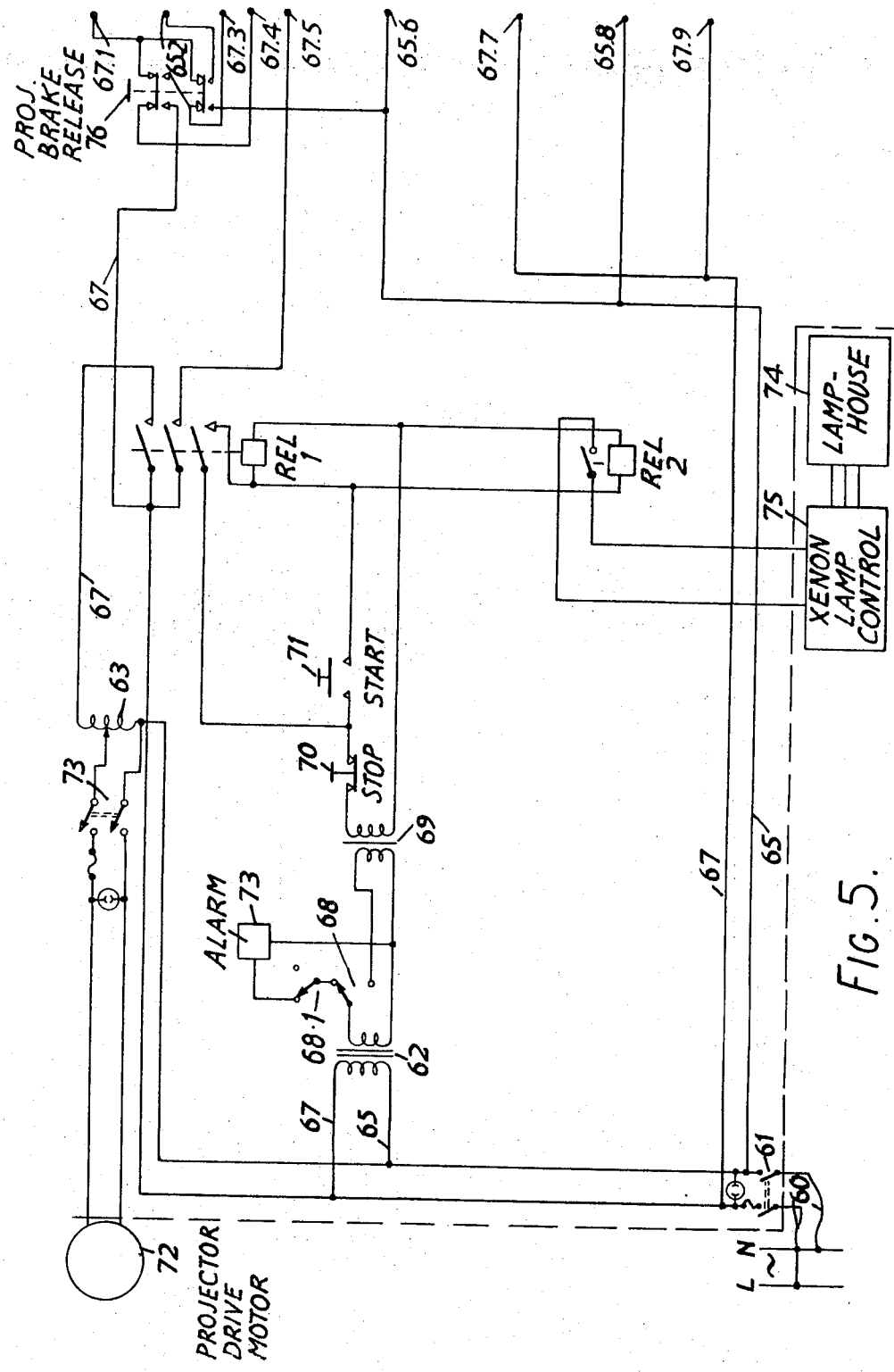
Figure 6:
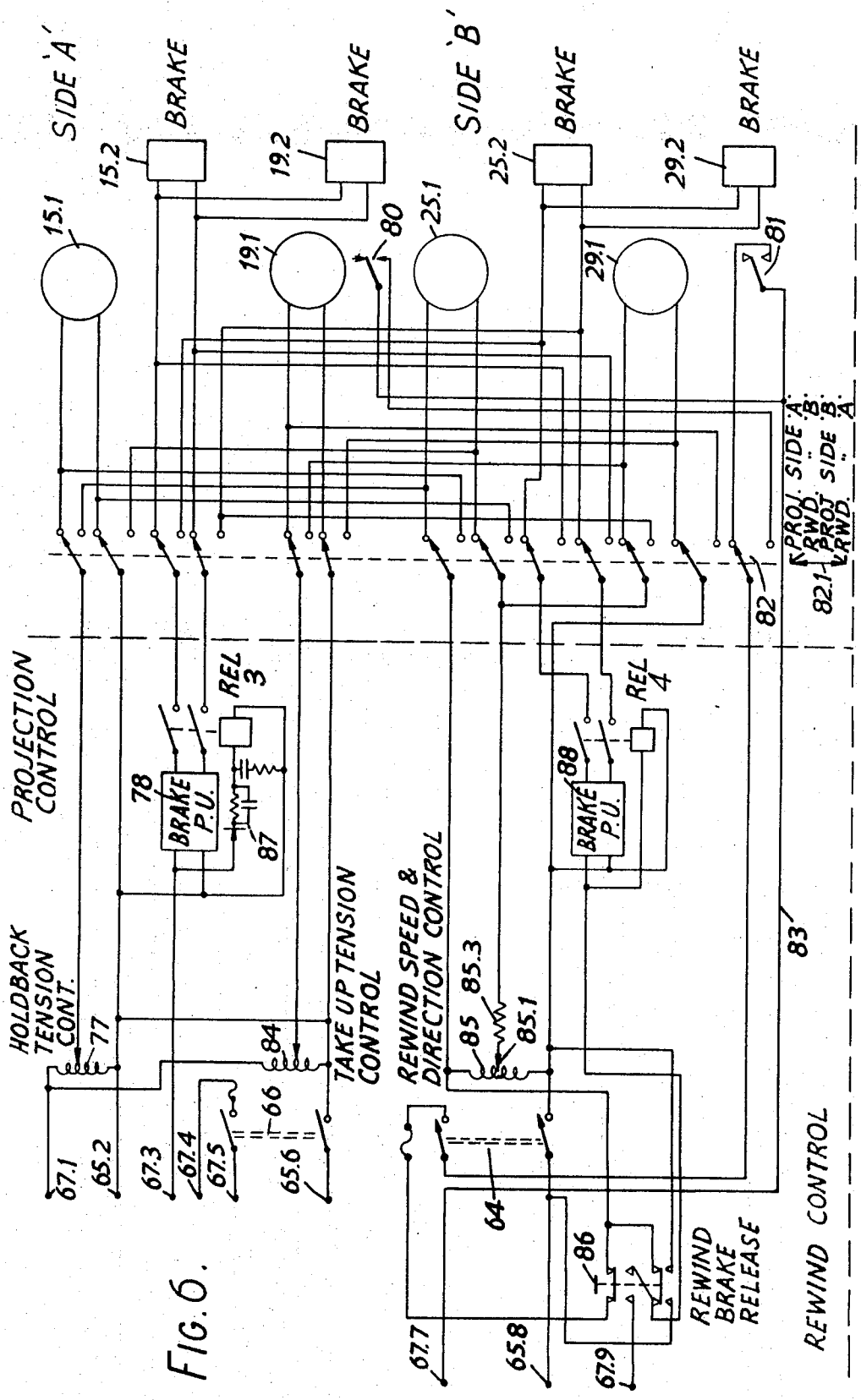
Figure 7:
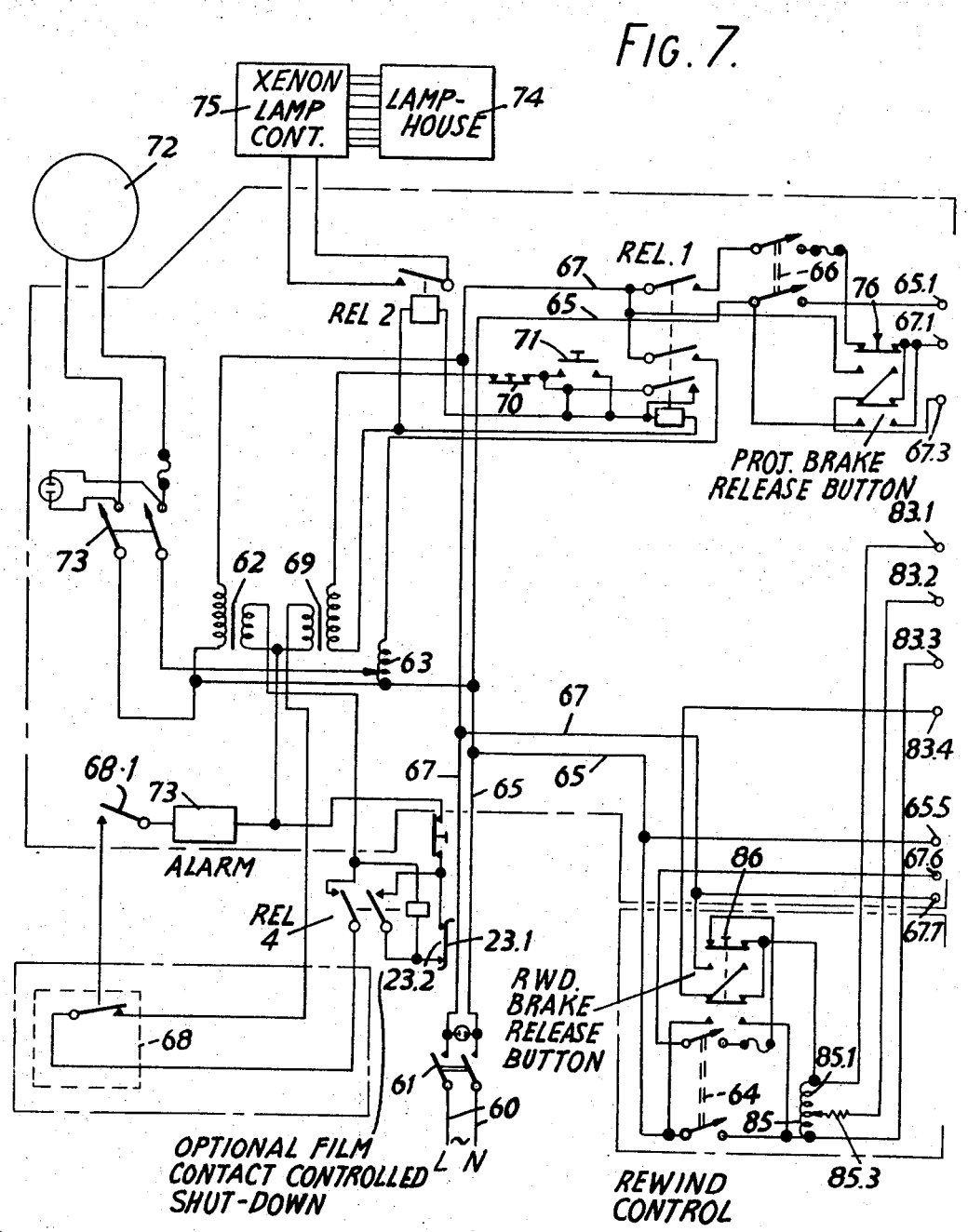
Figure 8:
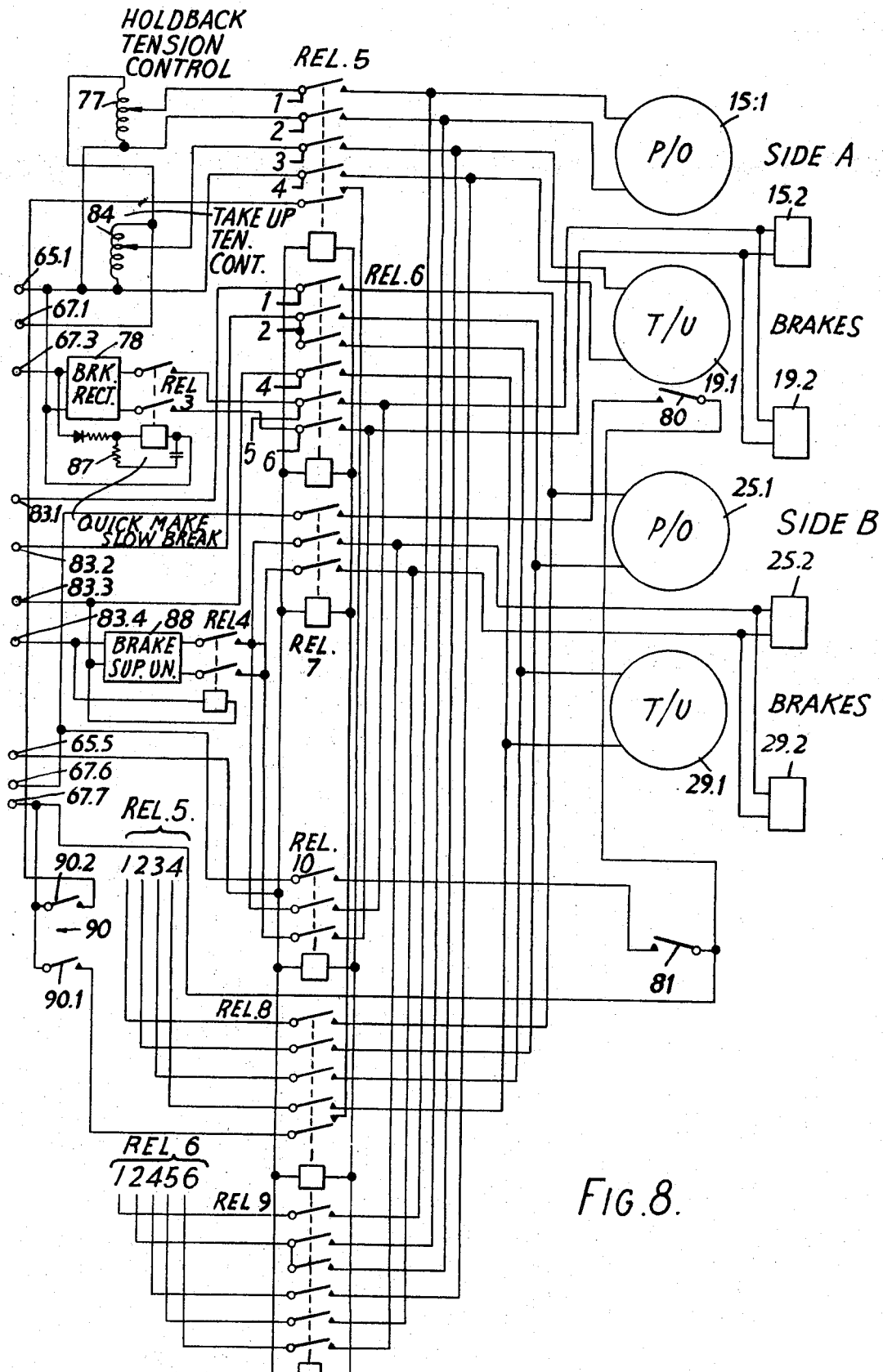
Figure 9:
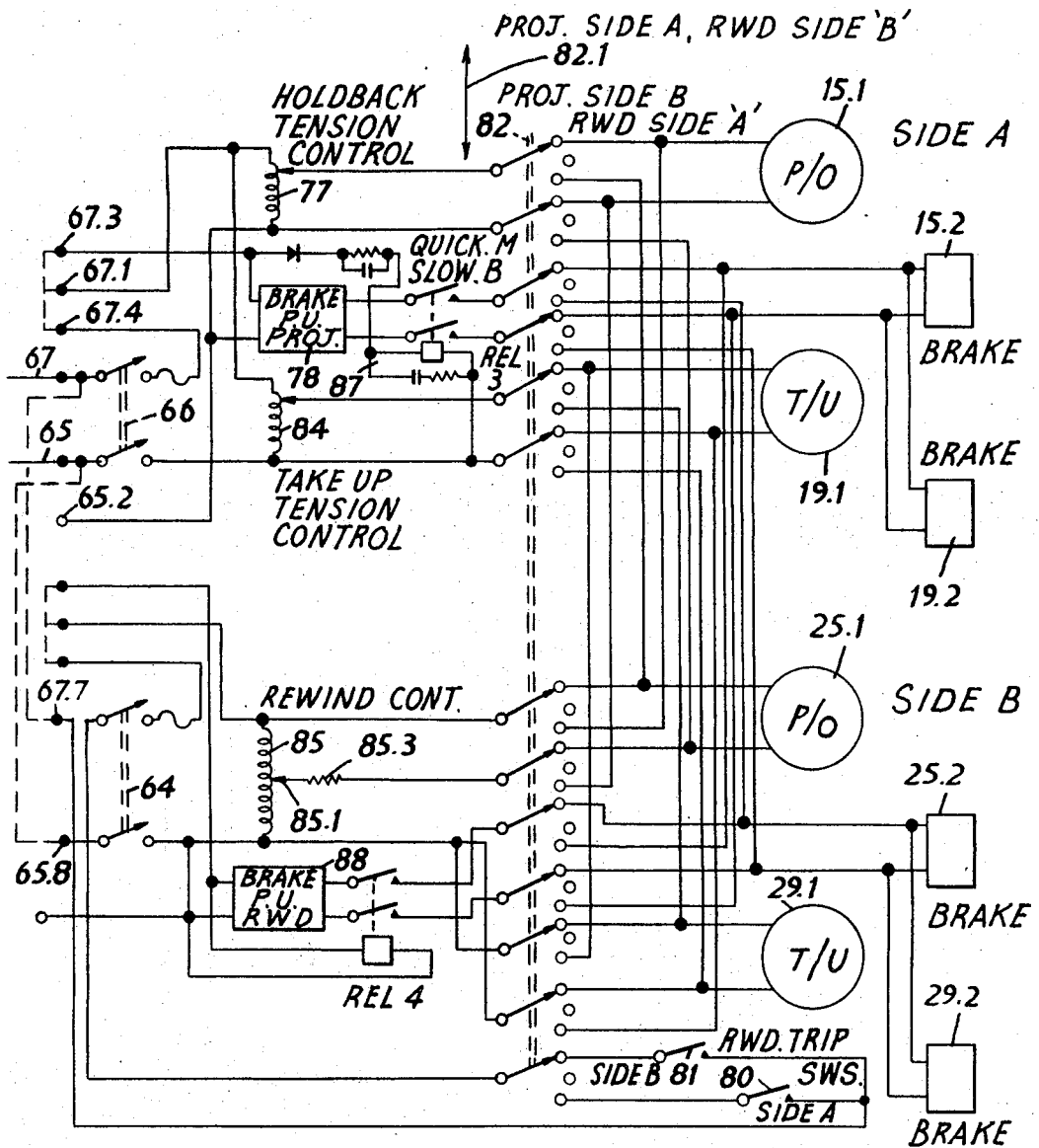

FIGS. 5 and 6 together are a schematic circuit diagram of the power supply and control apparatus of the projector according to the present invention; FIG. 5 showing particularly apparatus associated with the projector unit and FIg. 6 showing particularly apparatus associated with the large-reel, film pay-off and take-up unit;

FIGS. 7 and 8 are a schematic circuit diagram of a modification of the power supply and control apparatus shown in FIGS. 5 and 6; and FIG. 9 is a schematic circuit diagram of yet another modification of the apparatus shown in FIGS. 6 and 8.

In FIG. 1, a standard 35 mm film projector, shown generally at 1, has a lamphouse and power unit 2 for a Xenon light source, a film gate and intermittent film transport unit 3 with associated projection lens 3', and a sound head and preamplifier unit 4, all mounted by a pedestal 6 on the floor 7 of a projection booth. The projector 1 is located to project through a porthole 8 in the front wall 9 of the projection booth onto a projection screen, not shown, in the adjacent auditorium.

An upper spool support 5 for a 6,000 feet spool and a lower spool support 5' are selected with the standard projector 1 and do not form part of the present invention.

Mounted in front of the projector 1, between the projector 1 and the projection booth wall 9, is a film pay-off and take-up unit shown generally at 10. The unit 10 comprises a central cabinet 11, housing generally the equipment described with reference to FIGS. 6, 8 or 9, mounted on a turntable 12 which is centrally mounted on a mounting plate 13 set into the floor 7. The turntable 12 is centralized on the plate 13 about its axis of rotation 10' and is rotatable on castors 14.

The opposite faces of cabinet 11, on the right and left-hand side of projector 1, have identical layout. Thus, the right-hand side of the unit in the direction of projection, seen in FIG. 1 and shown at the left in the view of FIG. 2, carries, at the top thereof, a pay-off motor box 15, from which projects a shaft 16 carrying a pay-off spool 17 secured by a lock-nut 18. At the bottom of the unit 10 is a take-up motor box 19, from which projects a shaft 20 carrying a take-up spool 21 secured by a lock-nut 22.

On the opposite face of cabinet 11 are similarly mounted, at the top, motor box 25 with shaft 26, carrying spool 27 secured by lock nut 28 and, at the bottom, motor box 29, with shaft 30, carrying spool 31 secured by lock nut 32.

The spools 17, 21, 27 and 31 are large-diameter spools, in this example about 36 inches overall diameter, able each to carry about 13,500 feet length reels of wound film, corresponding to about 2¼ hours continuous projection time at the normal projection speed of 24 frames per second.

When unit 10 is in the rotational position shown in FIG. 2, the first pair of spools 17 and 21 are in alignment with the transport mechanism 3 of projector 1.

Film 23 from pay-off spool 17 passes over a roller 33 positioned at the center of the upper spool support 5, is threaded through the sprockets of the film gate and transport mechanism 3, through the sprockets and sound head of unit 4, over roller 34 positioned at the center of the lower spool support 5' and onto the lower spool 21, as shown by dashed line 23 in FIG. 1.

In the same rotational position of the unit 10, the other pair of spools are arranged for rewinding of film from spool 31 on spool 27.

In the reverse rotational position of the unit 10, namely when unit 10 is rotated 180° the second pair of spools, pay-off spool 27 and take-up spool 31, are brought into alignment with the projector transport and gate mechanism 3.

In operation, a first pay-off spool, ground ready for projection, is loaded onto shaft 16. The free end of film is threaded through the mechanism of projector 1 and secured to the take-up spool 21. The projector 1 is started up and the contents of spool 17 are projected and taken up onto spool 21. Meanwhile, a second spool of film is placed on shaft 26 and an empty take-up spool is placed on shaft 30. When spool 17 is emptied, the projector is stopped, the unit 10 is rotated through 180°, the free end of the film on spool 27 is threaded through the projector 1 onto the take-up spool 31 and the second spool of the film projected. After projection has recommenced, the film from spool 21 is rewound onto the spool 17, both these spools now being on the "rewind" side of unit 10, oppositely to the position shown in FIG. 2.

Figure 3:
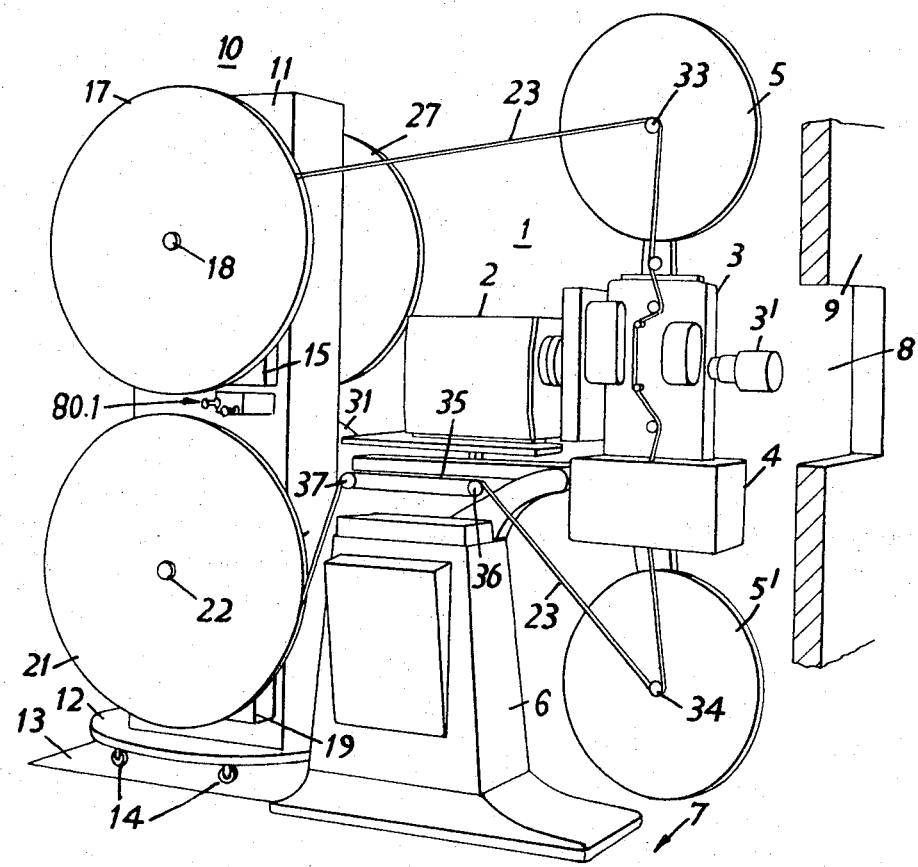
FIG. 3 is a perspective view of a modification of a large-reel film projector with a large-reel film pay-off and take-up unit mounted behind the projector unit.

FIG. 3 shows a modification of the invention in which the unit 10 is placed behind the projector 1. The spools 17 and 27 are lowered, relative to the position in which they are shown in FIG. 2, to conserve height, there being no need to provide a space between the upper and lower reels through which to project the picture.

Thus, in FIG. 3, parts corresponding to those shown in FIG. 1 are indicated by the same reference numerals.

When unit 10 is in the rotational position shown in FIG. 3, the first pair of spools 17 and 21 are in alignment with the transport mechanism 3 of the projector 1. Film 23 from pay-off spool 17 passes over the roller 33, in this case from rear to front, is threaded through the sprockets of transport mechanism and gate 3, through the sprockets and sound head of unit 4, over the roller 34, in this case from front to rear, over a film guide 35 including a front roller 36 and a rear roller 37 and onto the lower spool 21.

In the same rotational position of the unit 10, the spools 27 and 31 are arranged for rewinding of film from spool 31 onto spool 27, similarly to the arrangement of FIG. 1.

In the reverse rotational position of the unit 10, the second pair of spools, that is pay-off spool 27 and take-up spool 31, are brought into alignment with the film guide 35 and the roller 33.

The operation of the projector of FIG. 3 is similar to that described for the projector of FIG. 1.

Figure 4:
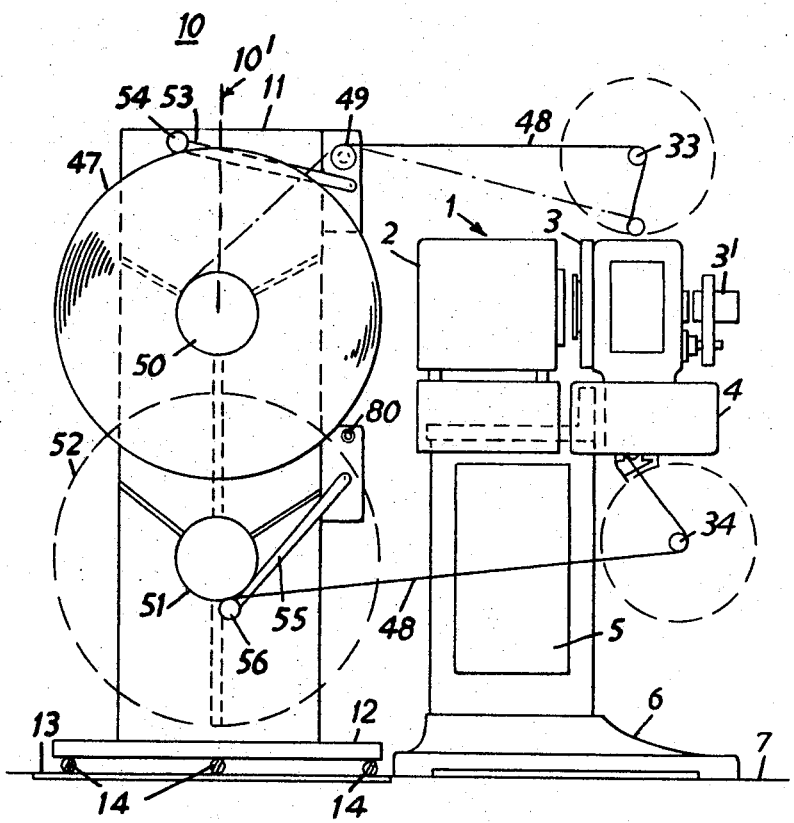
FIG. 4 is a side-elevation view of a modified form of the film projector of FIG. 3.

FIG. 4 shows another modification of the projector in which the unit 10 is placed behind the projector 1, but in which the spools 17, 21, 27 and 31 of the units 10 of FIGS. 1 and 2 and of FIG. 3 are replaced by film centers.

In FIG. 4, parts corresponding to those shown in FIGS. 1, 2 and 3 are indicated by the same reference numerals.

A reel of film 47 of some 13,500 feet length wound on a film center 50, has its free end passing over a pulley 49, threaded through the gate and intermittent feed unit 3, through the loop absorption unit 5, as shown by line 48, and secured to a take-up film center 51.

It will be understood that as the film from reel 47 is projected, the diameter of the wound film reel diminishes, down to the diameter of the film center 50. At the same time, the diameter of the wound film on take-up film center 51 increases, reaching the diameter of the broken line circle 52 when the film is fully taken up. The film centers 50 and 51 are spaced apart sufficiently to accommodate about 7,000 feet of film on each, without the film reels 47 and 52 touching.

A jockey pulley 54, carried by a pivoted arm 53, bears on the top of film reel 47. A similar jockey pulley 56, carried by a spring-loaded arm 55, bears on the underside of film reel 52. The angular positions of the arms 53 and 55 at any time sense the diameters of the pay-off and take-up film reels, respectively.

Referring, to the schematic diagram of FIGS. 5 and 6, a main A.C. supply is connected to the projector control apparatus of FIG. 5 by way of a flexible cable 60. The supply is controlled by a main supply isolating switch 61. The A.C. supply Neutral conductor 65 and Line conductor 67 are respectively connected to terminals 65.8 and to linked terminals 67.7 and 67.9, which terminals are shown also in FIG. 6. The A.C. supply front switch 61 is directly connected to a step-down transformer 62. The Neutral line 65 is connected directly to one end of a variable auto-transformer 63, to one pole of an isolating switch 66, at terminal 65.6 and to one pole of an isolating switch 64, at terminal 65.8. Both switches 66 and 64 are shown in FIG. 6. The Line conductor 67 is connected to the other pole of switch 64, at terminal 67.7.

The secondary winding of transformer 62 supplies a low-voltage circuit which is connected by way of a normally-closed, film break trip switch 68 to the primary of a step-up voltage transformer 69. The secondary of transformer 69 is connected by way of a normally-closed STOP switch 70 and a serially-connected, normally-open START switch 71 to parallel-connected relays REL 1 and REL 2. When the contacts of relay REL 1 are closed, the Line supply 67 at switch 61 is connected to the other end of variable transformer 63 and to the other pole of switch 66.

In the open position of film break trip switch 68, the secondary circuit of transformer 62 is connected to an alarm device 73 by way of an alarm inhibit switch 68.1.

Variable transformer 63 serves as a slow-start transformer for the drive motor 72 of the projector 1, which the transformer supplies by way of an isolating switch 73.

When the contacts of relay REL 2 are closed, a Xenon arc light source for projector 1, housed in a lamphouse 74, is supplied by a lamp control circuit 75. The control circuit 75 has an independent power supply, not shown.

In order to simplify the operation of lacing film 23 through the projector 1, a brake release button 76 is provided, temporarily to release pay-off and take-up film reel brakes, to be described later, for the purpose of inching film through the projector without need to draw off film against the friction of brakes. The brake release button 76 opens two pairs of associated switch contacts and closes two other pairs. Thereby, one end of a variable auto-transformer 77, FIG. 6, at terminal 67.1, is isolated from the Line pole of switch 66, FIG. 6, at terminal 67.4. One A.C. supply terminal of a D.C. brake power unit 78, FIG. 6, connected to terminal 67.3, is also isolated from terminal 67.1, but supplied directly from line 67. At the same time, the other A.C. supply terminal of brake power unit 78, FIG. 6, connected to terminal 65.2, is connected to Neutral Line 65.

Considering, now, particularly the apparatus shown in FIG. 6, in relation to that described with reference to FIG. 2 or FIG. 3, the side of unit 10 carrying spools 17 and 21, is identified as Side A and the side carrying spools 27 and 31 is identified as Side B. Each of the spools 17, 21, 27 and 31 is driven by a separate torque motor and controlled by a separate brake. Thus, on Side A, a pay-off torque motor 15.1 and associated brake 15.2 of FIg. 6 are housed in the motor box 15 of FIG. 2 or FIG. 3. Similarly, take-up torque motor 19.1 and associated brake 19.2 are housed in motor box 19. On Side B, pay-off torque motor 25.1 and brake 25.2 are housed in the motor box 25 and take-up torque motor 29.1 and brake 29.2 are housed in the motor box 29.

A switch 80, on Side A, is closed by film during rewinding of film on Side A. A corresponding switch 81, on Side B, is closed by film during rewinding of film on Side B.

A multiple-contact change-over switch 82 provides a change-over of projection control and rewind control between Side A and Side B of unit 10 to provide for projection for Side A and rewind by the side B and, alternatively, projection by Side B and rewind by Side A.

Thus, a projection control unit, to be described, is connected to control pay-off motor 15.1 and brake 15.2 and take-up motor 19.1 and brake 19.2, for projection by Side A. At the same time, a rewind control unit, to be described, is connected to control motors 25.1 and 29.1 and brakes 25.2 and 29.2, for rewind by Side B.

Alternatively, by the opposite mode setting of switch 82, the projections control unit is connected to control pay-off motor 25.1 and brake 25.2 and take-up motor 29.1 and brake 29.2, for projection by Side B. The rewind control unit is then connected to control motors 15.1 and 19.1 and brakes 15.2 and 19.2 for rewind by Side A.

The functions of switches 80 and 81 are correspondingly switched over.

The alternative mode positions of switch 82 are identified by arrows 82.1 and the associated legend of FIG. 6.

Figure 3A:
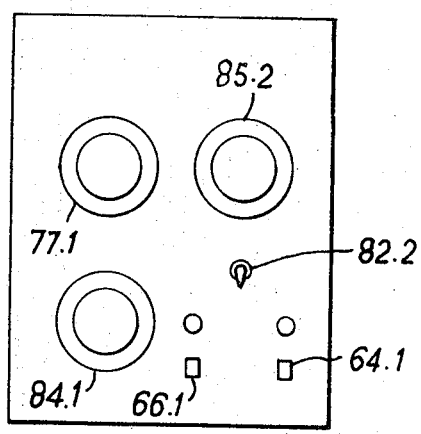
FIG. 3A is a front view detail drawing of a control box for the projector of FIG. 3.

A projection control unit and a rewind control unit are shown in FIG. 6 separated from each other, and from the apparatus associated with the unit 10, by broken lines. These two control units may be separated from each other, as at terminals 83, and separately housed and separately located in relation to the projector unit 1 and the pay-off and take-up unit 10. However, in the embodiment herein described, both are combined in a single control unit which is shown in FIG. 3A. Thus, referring to FIG. 3A, control knobs 77.1, 84.1 and 85.1 are, respectively, the manual controls for variable auto-transformers 77, 84 and 85, of FIG. 6. Switch knob 82.2 operates the change-over switch 82 and switch levers 66.1 and 64.1 respectively actuate switches 66 and 64 of FIG. 6.

In the projection control unit, the variable auto-transformer 77, which is supplied from terminals 67.1 and 65.2, in turn supplies the projection side pay-off motor and therby controls the film heldback tension. The variable auto-transformer 84, which is supplied from terminals 67.1 and 65.6, by way of switch 66, in turn supplies the projection side take-up motor and thereby controls the film take-up tension. The D.C. brake power unit 78, which is supplied with A.C. from terminals 65.2 and 67.3, supplies D.C. to the projection side motor brakes by way of a two-pole switch actuated by a relay REL 3. The solenoid of relay REL 3 is D.C. actuated by way of a rectifier and resistance-capacitance filter network 87, in order that the relay switch has quick make and slow break characteristics.

In the rewind control unit, the variable auto-transformer 85, which is supplied from terminals 67.7 and 65.8 by way of switch 64, supplies the rewind side pay-off and take-up motors oppositely. Thus, as the output contact 85.1 is moved from a central position, the voltage supplied to one torque motor is reduced while that supplied to the other motor is increased, thereby controlling both the direction and the speed of the rewind operation. A break release button 86 serves, similarly to the brake release button 76, temporarily to release the brakes of the rewind side motors for film threading, preparatory to film rewinding. Operation of the brake release button 86 opens two pairs of contacts and closes two other pairs to isolate the variable auto-transformer 85. A D.C. brake power unit 88, corresponding to the projection side brake power unit 78, is supplied from terminal 65.8 and from terminal 67.9 alternatively to terminal 67.7. The D.C. supply to the rewind side brakes is controlled by a two-pole switch actuated by a relay REL 4.

By way of explanation in detail of the projection operation, the following sequence of operations is involved:

1. The projector 1 is laced with film, through the path shown at 23, to set the micro-switch 68 on the projector.

If required, the brake release button 76 may be operated for convenience in drawing off film for lacing.

2. The isolating switches 61, 73 and 66 are closed, thereby operating indicator lamps.

3. The film brake alarm inhibit switch 68.1 is set to OFF.

4. The start button 71 is depressed momentarily to energize relay REL 1, thereby closing the contacts associated with relay REL 1. A set of contacts in parallel with switch 71 provides current to relay REL 1 after release of the switch.

Current is supplied by way of the relay REL 1 contacts to the slow-start transformer 63. Transformer 63 supplies power to the projector drive motor 72, by which the projector 1 is run up slowly.

Current is supplied by switch 86 and by way of a contact pair associated with brake release button 76 to the Hold-back and Take-up tension control transformers 77 and 84, respectively.

Relay REL 3 is energized, by the quick make/slow break network 87, to energize brakes 15.2 and 19.2 to release their hold on the shafts of pay-off motor 15.1 and take-up motor 19.1.

The motors 15.1 and 19.1 maintain sufficient tension on the film 23 to avoid formation of any film loop while the pay-off spool 17 and take-up spool 21 are running up to speed.

5. Hold-back and Take-up tensions are preset by adjustment of the outputs of variable transformers 77 and 84, by the corresponding control knobs 77.1 and 84.1.

Relay REL 2 closes a 110 volt A.C. supply circuit to the Xenon arc control 75.

The projector 1 is now fully operational.

6. In the event that the film 23 breaks, or a film joint parts, prior to leaving the sound unit 4, the film actuated trip switch 68 changes over. The alarm 73 is operated and the supply to relays REL 1 and REL 2 is broken. The projector lamp is extinguished, the project drive motor 72 is stopped and the pay-off and take-up torque motors are de-energized.

After a delay of four seconds, relay REL 3 opens circuit to de-energize the brake lock out coils. It is necessary that the pay-off spool is not instantly braked upon film break, since any difference is run-down times between the projector unit 1 and the pay-off and take-up unit 10 would result in film breakage or looping.

7. The film 23 is repaired and relaced in the projector unit 1, thereby resetting switch 68. The projector may then be restarted by depression of the START button 71. It will be noted that the projector cannot be restarted before film relacing resets switch 68. Further, the mere resetting of switch 68 does not restart the projector without manual operation of the START button 71.

8. For a controlled stop of the projector, the STOP button 70 is depressed. The circuit to relays REL 1 and REL 2 is opened. The projector lamp is extinguished, the projector drive motor 72 is stopped and the pay-off and take-up motors are de-energized, as described for film breakage. If the switch 68 is still held by the film, the projector may be restarted by depressing START button 71.

By way of explanation in detail of the film rewind operation, the following sequence of operations is involved:

1. The film to be rewound is laced over a roller, not shown, controlling the switch 80 or switch 81, and is led from the lower spool 21 or 31 to the upper spool 17 or 27. The film is steadied by hand and drawn taut. If required, the brake release button 86 may be operated to release the brakes to facilitate lacing.

2. The output of transformer 85, at tap 85.1, is adjusted by setting knob 85.2, to increase the supply to the upper rewind torque motor and to reduce the supply to the lower motor. The film is rewound from the lower spool onto the upper spool.

During rewind, the speed of the upper rewind motor may be controlled to slow down the film rewind speed for inspection, and possible repair, of the film.

A resistor 85.3 is provided in series with transformer tap 85.1 to provide always some voltage to either torque motor when the other is the take-up rewind motor. In consequence, the pay-off rewind motor is never running under no-voltage conditions, which might lead to free running of the pay-off spool and possible damage to the film.

3. When the film runs out from the pay-off spool, or if the film breaks during rewinding, the switch 80 or 81 opens to interrupt the A.C. supply to the rewind torque motors and to the D.C. brake supply unit 88 to apply the brakes to the rewind spool shafts.

Operation of change-over switch 82, correspondingly the axial rotational position of unit 10, determines the functions of Side A and Side B for projection and rewind. When one side is controlled for projection, the other side is controlled for rewind.

Consequently, a sequence of operations is possible, exemplified by the following:

1. A feature film of 13,500 feet length, wound on spool 15, is secured on the shaft of motor 15.1. The film is laced through projector 1 and returned to empty spool 19.

2. The film is projected from Side A.

3. A second feature film of 13,500 feet length, wound on spool 25, is mounted on Side B.

4. At the end of projection of the first film from Side A, unit 10 is rotated to bring Side B to the projection position.

5. The second film is laced and projected.

6. During projection of the second film from Side B, the first film is rewound on Side A.

7. If required, the first film could be removed from Side A and replaced by a third film, ready for projection at the end of projection of the second film, by rotation of Side A to the projection position again.

FIGS. 7 and 8 show a modified form of the apparatus described above with reference to FIGS. 5 and 6, particularly in that the operation mode change-over switch 82 of FIG. 6, which is manually operated by switch control 82.2, FIG. 3A, is replaced in the apparatus of FIG. 8 by two sets of contactors, whereby the change of operation mode is effected automatically when the unit 10 is rotated to interchange Side A and Side B for projection and rewind.

In FIGS. 7 and 8, elements similar to those shown in FIGS. 5 and 6 are indicated by the same reference numerals.

Referring to FIG. 8, a cam actuated switch 90 has contact pairs 90.1 and 90.2 which are closed alternatively when the unit 10 is rotated to its alternative position. Closure of contact pair 90.1 energizes three contactors REL 5, REL 6 and REL 7 to close associated contacts. These correspond to Side A being controlled for the projection mode and Side B for rewinding. Closure of contact pair 90.2 energizes three other contactors REl 8, REL 9 and REL 10 to close associated contacts. These correspond to Side B being controlled for the projection mode and Side A for rewinding. Inhibit contacts are provided in each set of contactors to prevent simultaneous closure of both sets of contacts.

Referring to FIG. 7, it will be noted that the rewind control apparatus is associated with the projection unit 1, by way of example.

Further in FIG. 7, there is shown an optional control feature operated by a conductive strip 23.1 cemented to the film 23. This feature permits of an automatically-controlled STOP operation at a predetermined point near the completion of projection of a reel of film during a projection mode of operation. The conductive strip 23.1 becomes effective when the film 23 runs through the projector to the point where the strip 23.1 bridges a pair of contacts 23.2, thereby connecting the low-voltage supply from transformer 62 to energize a relay REL 14. Operation of relay REL 14 closes a first contact pair to hold the relay energizing circuit and opens a second contact pair which are connected in series with the film break microswitch 68 contacts. Opening of this second contact pair shuts down the projection similarly to the opening of the contacts of switch 68.

FIG. 9 shows a further modified form of the apparatus of FIG. 6, the simplified form there shown requiring a greater manual control of the projection and rewinding modes. Thus, operation mode selection is by the switch 82, which is manually controlled at 82.2, FIG. 3A, in accordance with the rotational position of unit 10, FIG. 3. Braking of the torque motors during a rewind mode is effected by switch 80 or switch 81, when it is actuated by film breakage or film run out, when relay REL 4 is de-energized. In a projection mode, the brakes are energized by closure of relay REL 3, to free the torque motors throughout the film projection run.

In a projection mode, with switch 66 closed, both the pay-off and take-up torque motors are energized simultaneously with the brakes.

When the projector is switched off, removal of the mains supply 67, 65, de-energizes the torque motors 15.1 and 19.1, for example, when Side A is operating in the projection mode and, after four seconds delay, the brakes 15.2 and 19.2 are applied. Damage to the film being projected is thereby avoided.

This invention is not to be limited by the embodiments shown in the drawings or described in the description, which are given by way of example and not of limitation, but only in accordance with the scope of the appended claims.

What is claimed is:

1. Film pay-off and take-up apparatus comprising, in combination:
   a. a housing, a first spindle, a second spindle, a third spindle and a fourth spindle rotatably mounted on said housing, each of said spindles capable of carrying substantially large film reels;
   b. means mounting said housing for movement between first and second positions;
   c. said first and said second spindles being juxtaposed relative to each other whereby when said first and second spindles are in said first position, film wound in a reel carried on said first spindle can be threaded through an adjacently aligned projector thence in a reel onto said second spindle, and whereby when said first and said second spindles are in said second position said film can be rewound from said second spindle in a reel onto said first spindle;
   d. said third and said fourth spindles being juxtaposed relative to each other substantially similarly to said juxtaposition of said first and said second spindles, and being positioned complementally with said first and said second spindles, whereby said third and said fourth spindles are in said second position when said first and said second spindles are in said first position, and said third and said fourth spindles are in said first position when said first and said second spindles are in said second position; and
   e. driving means including separate motors for each spindle and control means controllably driving said motors driving said first and said second, or said third and said fourth spindles, independently when in said first position, and controllably driving said motors driving said first and said second, or said third and said fourth spindles commonly when in said second position.

2. Film pay-off and take-up apparatus for a film projector comprising:
   a. a housing rotatable about an axis on said projector between said first and second positions;
   b. first and second pairs of motor-operable spindles supported by said housing, each of said pairs of spindles being capable of carrying respective pay-off and take-up film reels for film projection and rewind, means mounting said housing for rotation about said axis for movement with respect to said projector whereby when said housing is in said first position, pay-off and take-up reels carried by said first pair of spindles are aligned with said projector for film projection and pay-off and take-up reels carried by said second pair of spindles are controllable for film rewind, and whereby when said housing is in its second position, pay-off and take-up reels carried by said second pair of spindles are aligned with said projector for film projection and pay-off and take-up reels carried by said first pair of spindles are controllable for film rewind; and
   c. driving means driving said motor-operable spindles including a separate motor for each spindle a first adjustable transformer, a second adjustable transformer, and a third adjustable transformer, means connecting said first adjustable transformer to the motor operating the film pay-off reel to control electric power thereto in the first projection position, means connecting said second transformer to the motor operating the take-up film reel to control electric power thereto in the first projector position, and means connecting said third transformer to both the motors operating the pay-off and take-up film reels to control electric power thereto in the second projector position.

3. Apparatus according to claim 2 further including a common resistor connected to a center tap of said third adjustable transformer.

4. Apparatus according to claim 2 further including switch means for controlling said first pair of spindles for a first, projection mode of operation while controlling said second pair of spindles for a first, rewind mode of operation and, upon housing rotation, controlling said second pair of spindles for a second, projection mode of operation while controlling said first pair of spindles for a second, rewind mode of operation.

5. Apparatus according to claim 4 in which said switch means includes first and second switch control means upon housing rotation operable to selectively control said first and second pairs of spindles for rewind and projection mode of operation, said switch control means being selectively operable in accordance with the rotational position of said housing.

6. Apparatus according to claim 2 further including a brake associated with each of said motors, each of said brakes being adapted to release when electrically energized and to brake when de-energized.

7. Apparatus according to claim 6 further including first and second brake release switches, said first brake release switch controlling the brakes associated with the each of said motors controlled for projection mode of operation and said second brake release switch controlling the brakes associated with the each of said motors controlled for rewind mode of operation.

8. Apparatus according to claim 7 further including sensor means responsive to breakage of film laced through the projector to operate a control circuit to shut down electric power to each of motors controlled for projection mode of operation.

9. Apparatus according to claim 8 further including delay means for delaying operation of the brake associated with each of said motors controlled for projection mode of operation for a predetermined period of time after shut down of electric power to the associated motor to brake rotation of the spindles positioned for the projection mode of operation only after shut down of electric power to the associated pair of motors.

10. Apparatus according to claim 8 further including switch means for controlling said first pair of spindles for projection mode of operation while controlling said second pair of spindles for rewind mode of operation and, upon housing rotation, controlling said second pair of spindles for projection mode of operation while controlling said first pair of reels for rewind mode of operation.

* * * * *